(12) United States Patent
Kong et al.

(10) Patent No.: US 6,527,007 B2
(45) Date of Patent: Mar. 4, 2003

(54) FLUID TRANSFER SYSTEM

(76) Inventors: Carl Cheung Tung Kong, 6122 Whittier Blvd., Los Angeles, CA (US) 90022; John Kong, 6122 Whittier Blvd., Los Angeles, CA (US) 90022

( * ) Notice: Subject to any disclaimer, the term of this patent is extended or adjusted under 35 U.S.C. 154(b) by 26 days.

(21) Appl. No.: 09/779,310

(22) Filed: Feb. 8, 2001

(65) Prior Publication Data

US 2001/0023710 A1 Sep. 27, 2001

Related U.S. Application Data

(60) Continuation-in-part of application No. 09/611,919, filed on Jul. 7, 2000, now Pat. No. 6,231,009, which is a division of application No. 09/212,767, filed on Dec. 16, 1998, now Pat. No. 6,125,882.

(51) Int. Cl.[7] ................................. G05D 7/00
(52) U.S. Cl. ................... 137/572; 137/563; 137/565.01
(58) Field of Search .................. 137/572, 563, 137/565.01

(56) References Cited

U.S. PATENT DOCUMENTS 3,490,482 A * 1/1970 Sachs et al. ................ 137/572
4,593,951 A * 6/1986 Slaats et al. ................ 297/347
4,621,868 A * 11/1986 Staats et al. ................ 297/347

* cited by examiner

*Primary Examiner*—Kevin Lee
(74) *Attorney, Agent, or Firm*—Kelly Bauersfeld Lowry & Kelley, LLP (57) ABSTRACT

A closed fluid transfer system is provided including a fluid source in fluid communication with an inlet of a hollow body. The hollow body includes a flexible and expandable wall, typically composed of elastomeric material, at one end thereof. An outlet is formed distal from the flexible and expandable wall. Fluid is transported from the fluid source to the hollow body through a tube by a pump or the like. The hollow body may constitute a fluid conditioning chamber. Alternatively, the hollow body serves as a fluid source for an energy production device. The hollow body may also be fluidly connected to a vehicle for use as a fuel tank.

20 Claims, 7 Drawing Sheets

FLUID TRANSFER SYSTEM

RELATED APPLICATION

This application is a continuation-in-part of U.S. patent application Ser. No. 09/611,919, filed Jul. 7, 2000 now U.S. Pat. No. 6,231,009, which is a division of U.S. patent application Ser. No. 09/212,767, filed Dec. 16, 1998 now U.S. Pat. No. 6,125,882.

BACKGROUND OF THE INVENTION

The present invention relates to the transfer of fluid. More particularly, the present invention relates to fluid transfer systems which utilize a low-friction flexible wall within a hollow body to facilitate fluid transfer.

There are a great number and a variety of pumps in the art. The typical purpose of the pump is to move air or liquid from one location or container to another. Generally, a piston is movable within the pump to create a negative pressure or vacuum which moves the fluid from one location to the other. Pumps can be manually actuated or connected to an electronic or mechanical device. One of the problems associated with prior art pumps is that they have typically produced a tremendous amount of friction. This limits the efficiency of the pump and increases the cost of pumping the air or liquid from one location to another. Another problem associated with prior art pumps is that they can only pump liquid to a certain height. The higher the height of liquid, the harder it is to pump due to gravitational forces exerted upon liquid.

It has been found that using an elastomeric wall decreases the energy needed to create fluid flow. Such fluid flow can be utilized for many applications. For example, such low-friction flexible walls can also be advantageously used in applications where fluid is removed from a holding tank. In such holding tanks, and particularly hand-held portable holding tanks, the influx of air during fluid removal creates pockets of air within the fluid that causes the draining fluid to surge periodically and unexpectedly, potentially causing spills of the fluid. Such spills can potentially be a hazard to the operator of the tank, or the environment, such as in the case when oil or gasoline is drained from containers. With an elastomeric wall installed in a base of the tank or container, and allowed to travel the length of the container, the fluid flows smoothly and accurately. Fluid transfer systems having such an elastomeric wall also enable the fluid pumped into the system to be pumped to great heights as the system overcomes gravitational forces.

In other applications, vehicles, such as aircraft or spaceships, require a tremendous storage space for the fuel required for their travel. The storage of such fuel within the aircraft results in a heavier aircraft which requires additional fuel to be burned during its travel. It would be advantageous to provide a system for transferring fuel to the aircraft or spaceship, which does not require the aircraft or spaceship to store such a heavy load.

SUMMARY OF THE INVENTION

The present invention resides in a closed fluid transfer system intended to facilitate fluid flow. The system generally comprises a fluid source and a hollow body in fluid communication with the fluid source through an inlet of the hollow body. The hollow body includes a flexible and expandable wall at one end thereof, and an outlet distal from the flexible and expandable wall. Means are provided for transporting fluid from the fluid source to the hollow body. Such means typically includes a pump associated with the system.

In a first embodiment of the invention, the hollow body comprises a fluid conditioning chamber. A tube extends from the fluid source to the hollow body inlet. The tube typically comprises a siphon tube. Means can be provided for stopping the flow of fluid through the siphon tube. The tube may include a primer device intermediate the fluid source and the hollow body inlet which can be used to initiate the flow of fluid. Preferably, a pump injects air into the fluid source, causing the fluid to enter into the tube and travel to the hollow body. A tube extends from the outlet of the hollow body to the fluid source for redirecting the fluid back into the fluid source. The hollow body may include a one-way-valve positioned generally opposite the elastomeric flexible wall which can be used to remove air from the hollow body so that the liquid fills the hollow body and a closed system is created, inject substances into the hollow body for conditioning, or open the system to facilitate draining, if necessary.

In another preferred embodiment of the present invention, the hollow body comprises a portable fluid tank. The flexible and expandable wall includes a rigid portion which extends substantially from the side walls of the hollow body. The rigid portion is capable of reciprocal travel within the hollow body as fluid from the fluid source is added to the hollow body, and as fluid from the hollow body is removed from the outlet thereof.

In yet another embodiment of the present invention, the hollow body comprises a water tower in fluid communication with a fluid source, such as a holding tank or reservoir. A second hollow body has an inlet fluidly connected to the outlet of the hollow body. Means are provided for transporting the fluid from the fluid source, to the hollow body and subsequently to a second hollow body. The means for transferring the fluid from the first hollow body to the second hollow body typically comprises a gravitational flow tube extending from the outlet of the hollow body to the inlet of the second hollow body, the outlet and the hollow body being elevated with respect to the inlet of the second hollow body. The fluid may be returned from the second hollow body to the fluid source. A turbine or the like can also be placed intermediate the hollow body and fluid source, or the hollow body and the second hollow body so that energy can be produced from the fluid flow. In a particular embodiment, the second hollow body has a flexible and expandable wall end thereof, as well as an outlet distal to the flexible and expandable wall. A pump is typically associated with the system for transporting the fluid between the fluid source and the hollow bodies.

In yet another embodiment, the hollow body is fluidly connected to a transportation vehicle, such as an aircraft. The fluid source comprises fuel which is delivered to the hollow body via an elongated tube. A second tube mixed in from an oxygen source to the transportation vehicle to allow the fuel to be combusted at extreme elevations.

In still another embodiment, the system includes a plurality of hollow bodies fluidly connected to one another and positioned in an aircraft such that as fluid is transferred from one hollow body to another, the weight distribution of the airplane is altered resulting in upward, downward, left turn or right turn motions. If necessary, the liquid can be channeled through the rudder or other such flight control mechanism to effectuate these movements.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the drawings for purposes of illustration, the present invention is concerned with a closed fluid transfer system.

Figure 1:
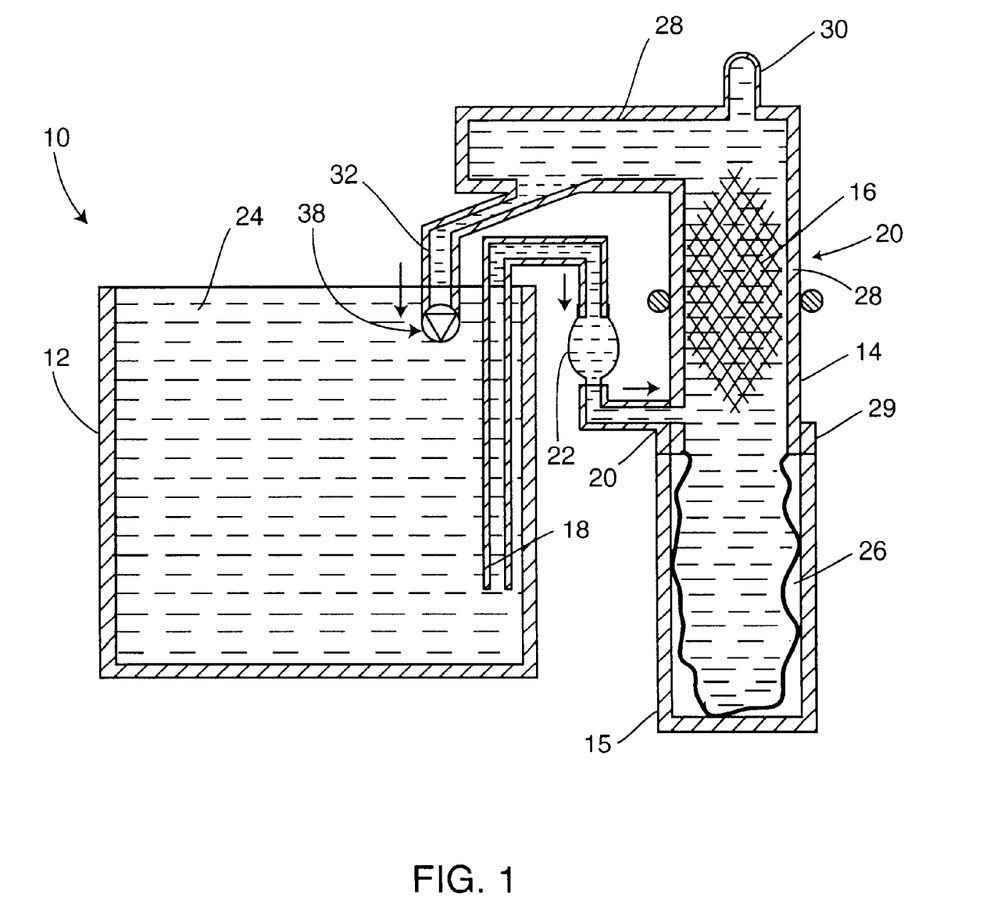
FIG. 1 is a cross-sectional view of a closed fluid transfer system embodying the present invention and used to condition fluid.

With reference to FIG. 1, a closed fluid transfer system 10 is illustrated having a fluid source 12 and a hollow body 14 in fluid communication with the fluid source 12. In a particularly preferred embodiment, the fluid source 12 comprises a fish tank, and the hollow body 14 has therein a fluid conditioning chamber 16 which may include a sponge or cotton filter and/or charcoal and the like. A siphon tube 18 extends into the fluid source 12 below a free liquid surface thereof at one end, and attaches to an inlet 20 of the hollow body 14. Preferably, a primer device 22, such as a flexible ball-type primer, is interposed intermediate the length of the siphon tube 18 so that the primer device 22 can be actuated to initiate the flow of fluid 24 from the fluid source 12 to the hollow body 14. A lower end of the hollow body 14 comprises a flexible and expandable wall 26, preferably comprised of an elastomeric material such as latex. If necessary, a rigid holder 15 can be attached to the walls 28 of the hollow body 14 by a tension or screw-type ring 29 in order to protect the flexible wall 26, and also to prevent the flexible wall from continuous expansion. In the embodiment illustrated in FIG. 1, the remaining walls 28 of the hollow body 14 are rigid in nature. A one-way valve 30 can be formed in a wall 28 distal from the flexible wall 26 in order to allow conditioning chemicals or the like into the hollow body 14, or additional fluid 24, or even air to facilitate the draining of the hollow body, if found necessary. The one-way valve 30 is also used to draw air out of the hollow body 14 so that the fluid therein can fill the hollow body 14 and create a closed system. The hollow body 14 also includes an outlet 32 which returns the conditioned fluid 24 back into the fish tank fluid source 12.

Thus, as the bulb-type primer device 22 is actuated, fluid flows into the siphon tube 18, through inlet 20 and into the hollow body 14. The fluid fills the hollow body 14 until it passes through the conditioning chamber 16, after which it is allowed to flow through outlet 32 and back into the fish tank fluid source 12. It has been found that including the flexible wall 26 facilitates the flow of fluid through the hollow body 14. Pump 38 may also be used to facilitate fluid flow through the hollow body 14 by drawing fluid out of the system 10.

Figure 2:
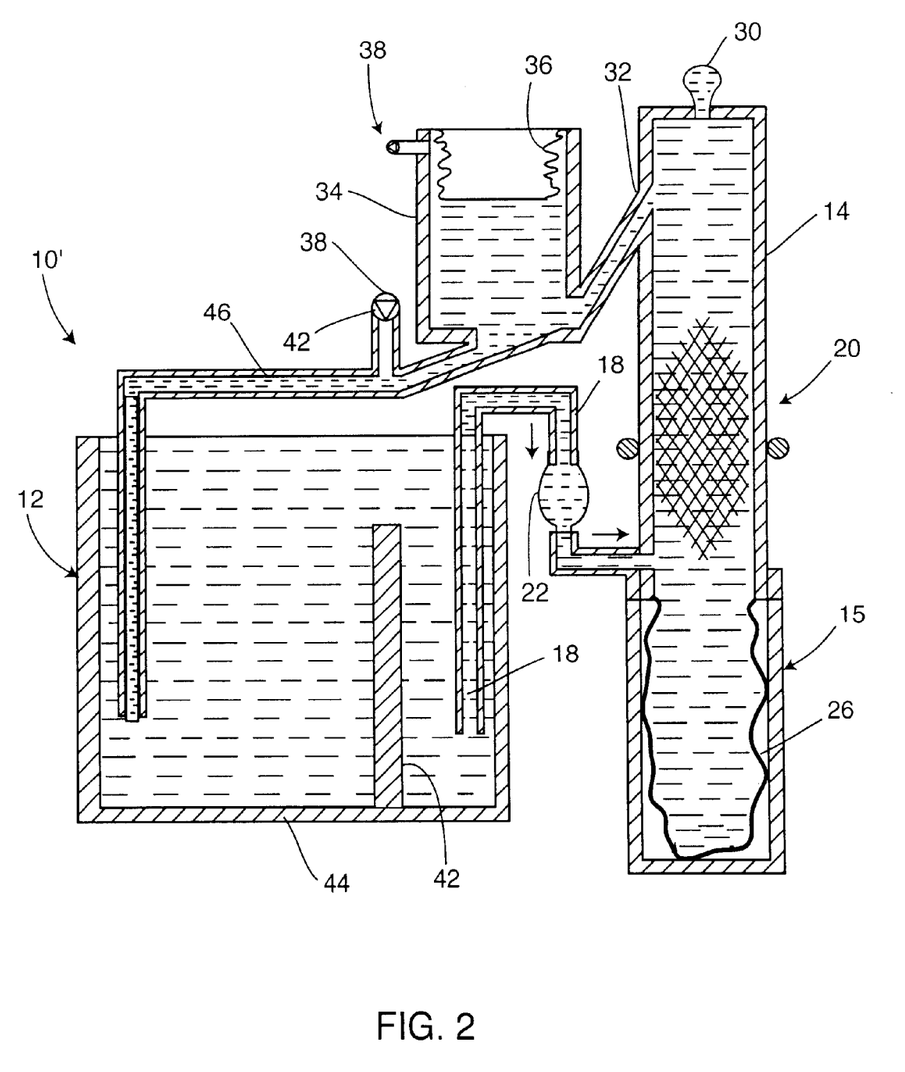
FIG. 2 is a cross-sectional view of a closed fluid transfer system similar to FIG. 1.

Referring now to FIG. 2, a variation of the above-described embodiment is illustrated. The hollow body 14 includes the conditioning chamber 16, siphon tube 18, primer device 22, and flexible wall 26. However, the outlet 32 of the hollow body 14 dispenses the conditioned fluid by gravity flow, into another chamber 34 which also includes a flexible wall 36 at an end thereof. This second chamber 34 is connected to a pump 38. This pump 38 can be used to draw air out of a one-way valve of the second chamber so that it becomes a closed system. It has been found that incorporating the second flexible wall 36 generally opposite the flexible wall 26 of the hollow body 14 further facilitates the flow of fluid through the conditioning chamber 16. This may be, in part, due to the fact that the flexible walls 26 and 36 can expand or retract as necessary as the fluid 24 flows.

In a particularly preferred embodiment, the pump 38 injects air through a one-way-valve 42 so that the discharged fluid 24 is aerated. An interior wall 42 is formed in the fish tank 12 such that it extends from the base 44 to a predetermined height, not exceeding the height of the fluid 24 in the fish tank 12. The wall 42 is positioned between the outlet 46 of the second chamber 34 and the siphon tube 18 so as to prevent air bubbles from entering the siphon tube 18. In this embodiment, it has been found that the air injected by a pump 38 provides sufficient energy to the fluid 24 within the fish tank 12 so that the fluid 24 flows through the siphon tube and through the conditioning chamber after initially primed by a priming device 22.

Figure 3:
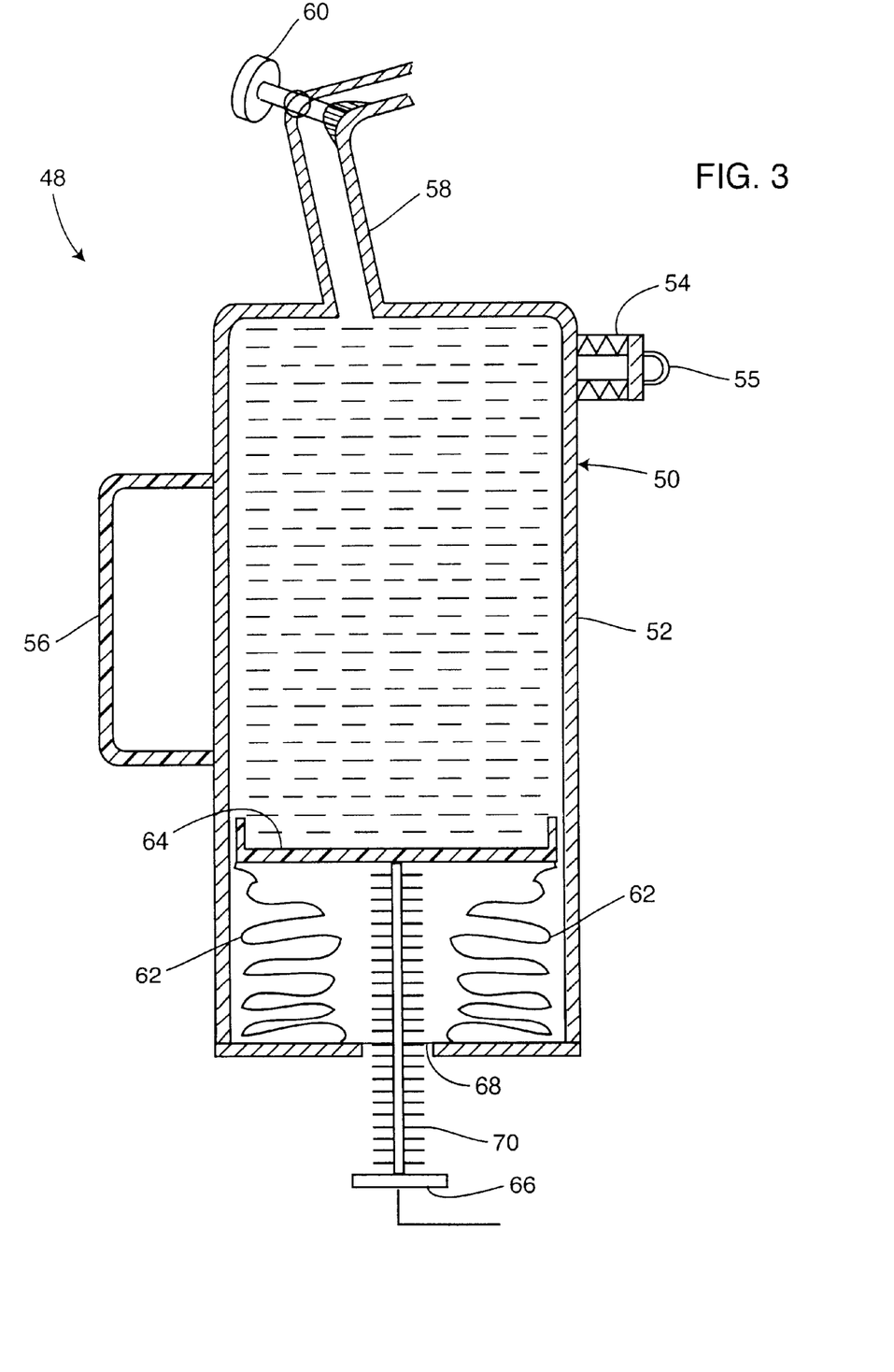
FIG. 3 is a cross-sectional view of a fluid transfer system in the form of a portable fluid container.

Referring to FIG. 3, another closed fluid transfer system 48 is illustrated. This system 48 is typically incorporated into a portable fluid tank, such as a gasoline tank or the like. The system 48 includes a hollow body 50 defined by an outer rigid wall 52. An inlet 54 extends through the wall 52 and is configured so as to be capable of being placed in fluid communication with a fluid source, such as gasoline. Cap 55 is placed over the inlet 54 to close it and prevent spilling. A handle 56 is attached to the outer wall 52 to facilitate transportation and the dispensing of fluid from within the hollow body 50. An outlet 58 is formed in the outer wall 52 at one end of the hollow body 50. The outlet 58 can be rigid, flexible, straight or angled as dictated by the needs of the user. Typically a valve 60 is incorporated into the outlet 58 so that the fluid within the hollow body 50 can be prevented from exiting the outlet 58 until the valve 60 is opened. The valve 60 can also include a one-way-valve for preventing air from entering into the hollow body 50 through the outlet 58 while the gasoline fluid is dispensed from the hollow body 50.

The end of the hollow body 50 opposite the outlet 58 includes a flexible and expandable membrane 62 interconnected between the rigid outer wall 52 and a internal rigid wall 64 which substantially extends across the space within the hollow body 50. This internal wall 64 is allowed to travel reciprocally within the hollow body 50 depending on the level of fluid with the body 50. Preferably, the internal wall 64 is attached to a rod 66 which extends through an aperture 68 of the wall 52. This rod 66 can act as a piston to position the internal wall 64 and facilitate the flow of fluid from the hollow body 50 through the outlet 58. For example, a user may exert pressure upon the rod 66 and move the internal wall 64 towards the outlet 58, causing fluid to exit there-through. The rod 66 can then be retracted towards the aperture 68 to allow additional fluid to be added to the hollow body 50. Such movement towards the aperture 68 can also facilitate the inflow of fluid, such as gasoline, through the inlet 54 by creating a vacuum-like condition within the hollow body 50. Preferably, the rod 66 includes graduated markings 70 to enable the user to determine the amount of fluid within the hollow body 50.

Figure 4:
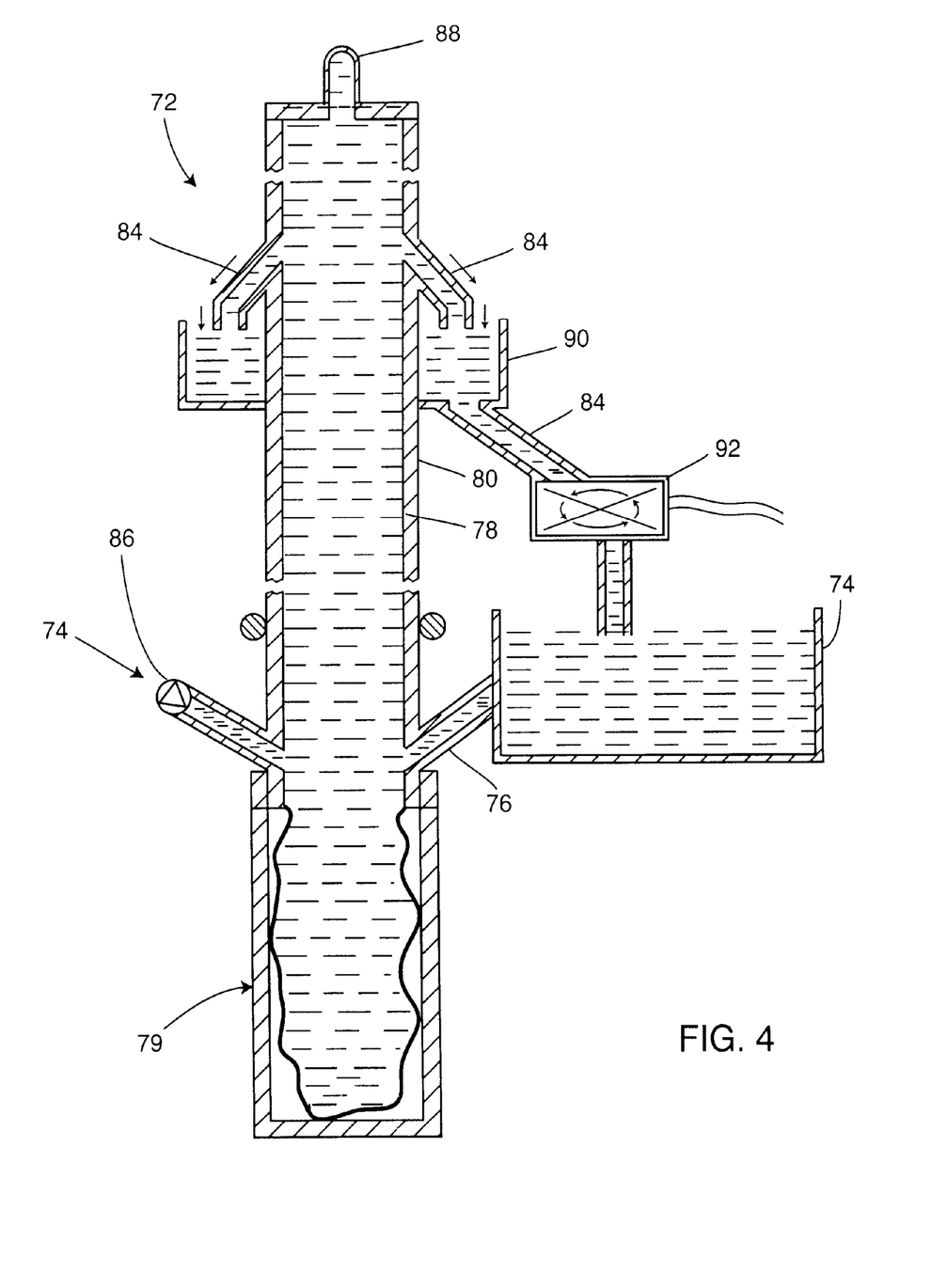
FIG. 4 is a cross-sectional view of a fluid transfer system embodying the present invention and used to generate electricity.

With reference to FIG. 4, another closed fluid transfer system 72 is illustrated. The system 72 includes a fluid source 74, such as a reservoir, which is in fluid communication through a pipe 76 or the like with a hollow body 78 in the form of a water tower. The tower 78 is an elongated structure defined by a rigid outer wall 80, with the exception of one end thereof which is defined by a flexible and expandable wall 82. This flexible wall 82 has been found to facilitate the flow of fluid from the fluid source 74 to the tower 78 and through an outlet 84 of the tower 78. A pump 86 is associated with the system 72 so as to create this fluid flow, although the fluid from reservoir 74 can flow into the tower 78 by gravitational flow. An additional pump 86 can be added to the tower at a predetermined location to facilitate fluid flow throughout the entire system 72. An inlet 88 having a one-way-valve may be incorporated into the tower 78 distant from the flexible wall 82 for adding additional fluid, connecting the tower 78 to the pump 86, or the like. The outlet 84 may directly dispense the fluid from the tower 78 to either the reservoir 74, or another location. Alternatively, the outlet 84 may dispense the fluid into a holding tank 90 for controlled delivery of the fluid. Preferably, a turbine 92 is interposed between the outlet 84 of either the tower 78 or holding tank 90 and the reservoir 74 or other location so that as the fluid flows by gravity electricity is produced.

Figure 5:
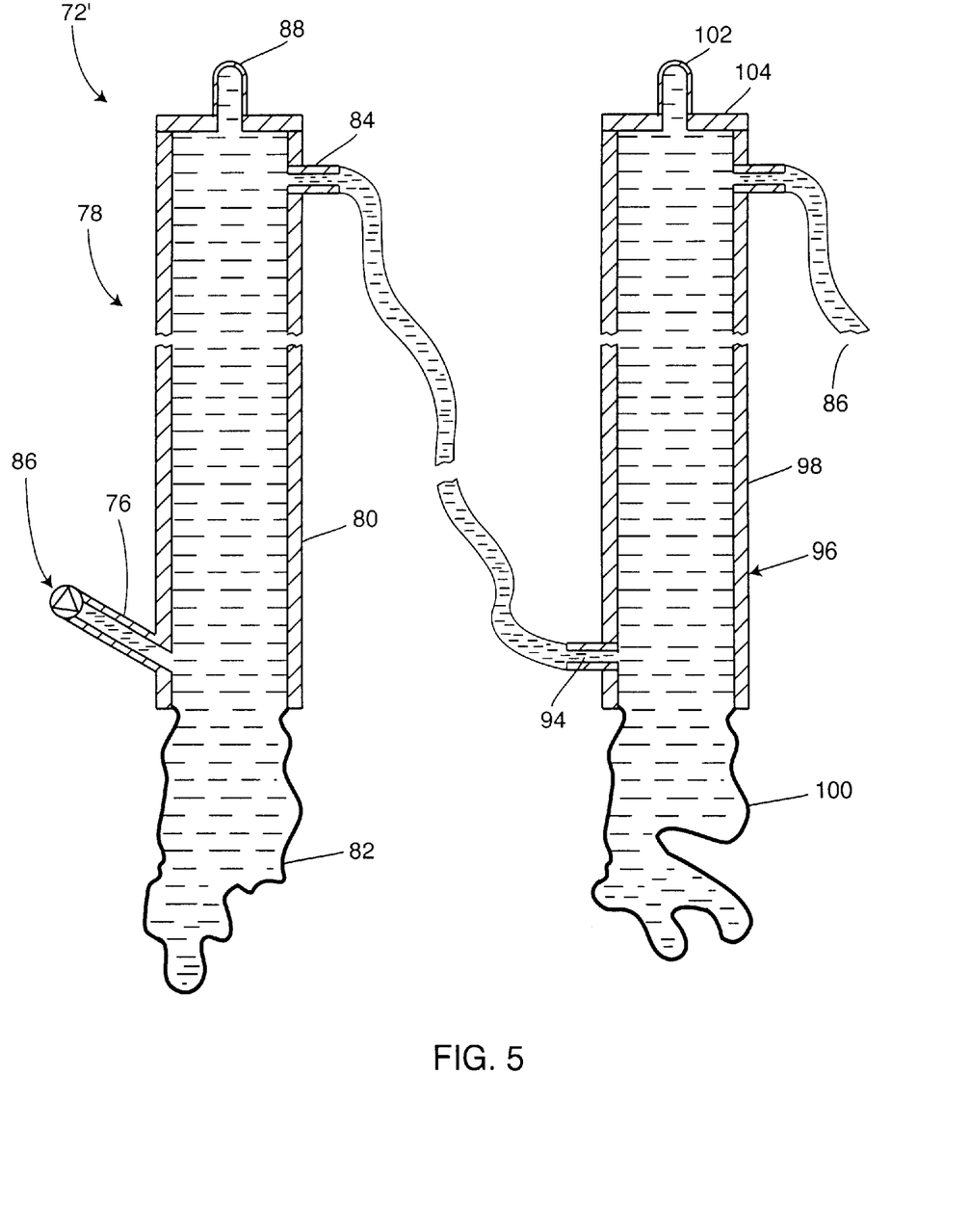
FIG. 5 is a cross-sectional view of a fluid transfer system, illustrating the transfer of fluid from a fluid source to a series of hollow bodies.

With reference now to FIG. 5, this system 72, instead of returning the fluid to the reservoir 74, delivers the fluid from the outlet 84 such that it flows by gravitational forces to an inlet 94 of another hollow body fluid tower 96 which also has a rigid wall 98, a flexible and expandable wall 100 at an end thereof, a one-way-valve 102 and an outlet 104. Using pump 86, or by gravitational flow, the fluid is transferred from the reservoir 74 to the first tower 78 and then to the second tower 96 and so forth until the fluid reaches its destination.

Figure 6:
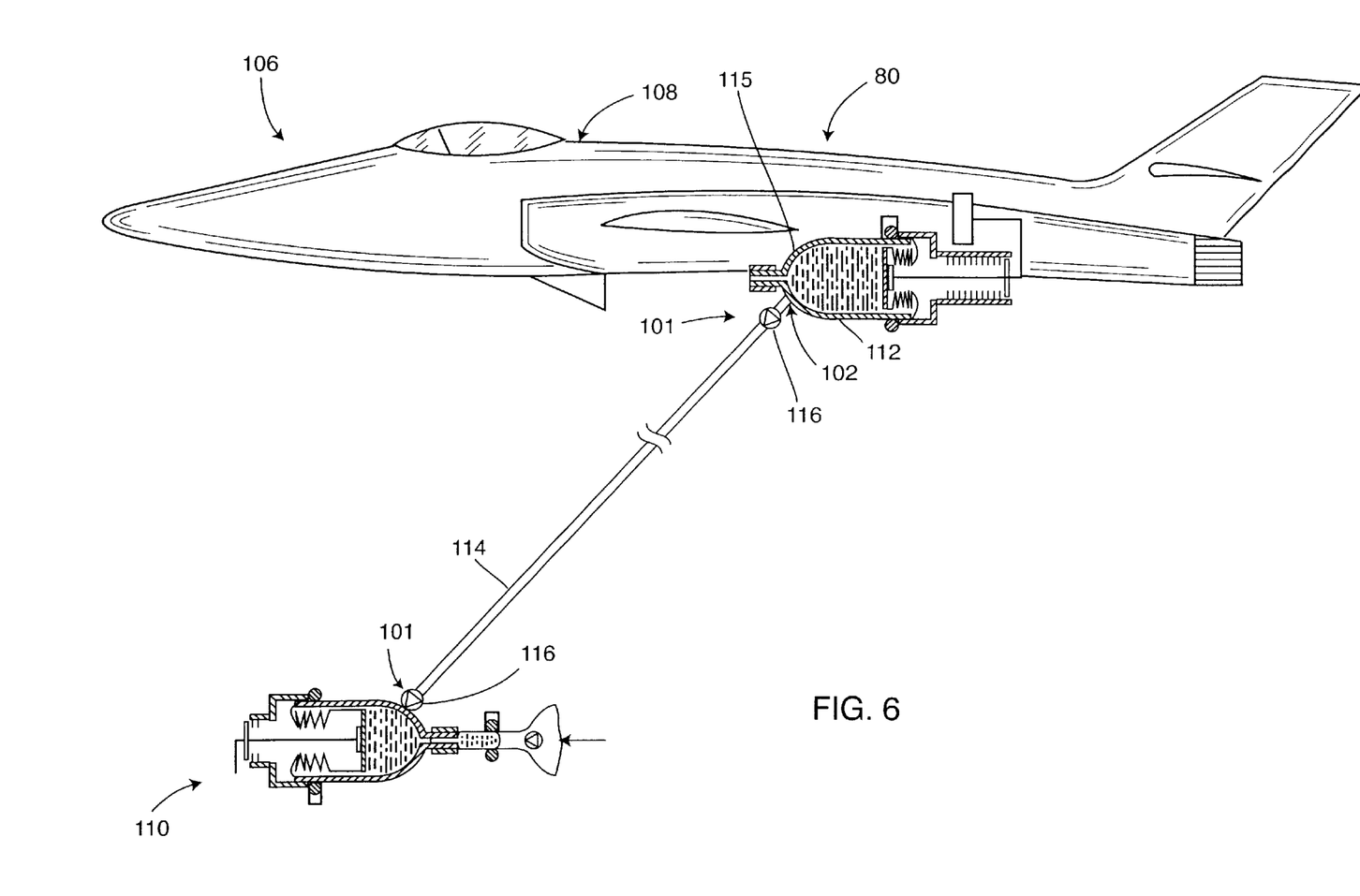
FIG. 6 is a schematic view of another closed fluid transfer system embodying the present invention, illustrating the transfer of fuel from a fuel source to a fuel tank connected to an aircraft.

With reference to FIG. 6, yet another closed fluid transfer system 106 is illustrated, having application to vehicle transportation such as aircraft and spaceships 108. A fluid fuel source 110 is provided on the earth. The fuel source 110 comprises jet fuel, liquid hydrogen, or whatever appropriate fuel is necessary to operate the vehicle 108. The fuel source 110 is in fluid communication with a hollow body fuel tank 112 connected to the engine of vehicle 108 by way of fuel outlet 115. The fuel tank 112 and/or fuel source include a flexible wall to facilitate fluid flow. The fuel source 110 and fuel tank 112 may comprise a variable volume fluid storage tank or reservoir as disclosed in U.S. Pat. No. 6,125,882 by Kong, the specification of which is hereby incorporated by reference.

The fuel source 110 and fuel tank 112 are fluidly interconnected by a long fuel transmission tube 114. Alternatively, the fuel transmission tube 114 can be connected directly to the engine of the vehicle 108 so that the tank 112 is empty when lifting to reduce the weight of the vehicle 108, then, before landing, tank 112 is filed so that the vehicle 108 can have greater range. This tube 114 is adequately strong, yet flexible, so that it can extend for thousands of feet, and if necessary miles, above the earth's surface. If necessary, the tube 114 is insulated to prevent the fuel from freezing. Without such insulation, the fuel may become frozen at extreme heights. However, the liquid fuel can be forced through the transmission tube 114 so that the frozen fuel is forced either directly into the engine or into tank 112, where it can be thawed. Preferably, one-way-valves are incorporated at the junction of the fuel source 110 and tube 114 connection as well as the tube 114 and fuel tank 116 connection, to prevent the downward travel of the fuel from the fuel tank 112. The fuel is pumped from the fuel source 110 and through the elongated tube 114 to the fuel tank 112 where it is combusted in standard fashion.

If necessary, an oxygen source on the earth is connected to the vehicle 108 via another elongated tube so that the fuel can be combusted when the aircraft exceeds a predetermined height where there is insufficient oxygen in the atmosphere to enable proper combustion.

It is contemplated that one fuel source 110 can have multiple fuel transmission tubes 114 extending therefrom and to several vehicles 108 which can interconnect and form a giant air space vehicle.

In use, the fuel tank 112 is filled with a predetermined amount of fuel to enable it to lift off. Additional fuel is pumped to the fuel tank 112 through tube 114. When the aircraft 108 reaches a predetermined altitude or distance, the tube 114 is released from the fuel tank 112. The aircraft 108 can then use the remaining fuel within the fuel tank 112, or glide, to arrive at its destination. In applications where the vehicle 108 comprises a rocket or spaceship, fuel is pumped to the fuel tank 112 through tube 114 until the spaceship has reached its predetermined orbit, when the tube 114 is released from the vehicle 108 and descends back to earth. As exhausted fuel tanks are already jettisoned from spacecraft and jets, jettisoning the fuel tube 114 is not necessarily a new concept. Also, the military currently uses wire lines in missel guidance systems which extends for thousands of meters and even miles to guide the missel to its intended target. Thus, utilization of a fuel line 114 extending thousands of meters or even miles is not inconceivable.

This system 106 provides many advantages over currently used aircraft and spaceship travel. Currently, such vehicles 108 must be capable of providing a tremendous force to lift not only the weight and payload of the vehicle 108, but also the fuel stored within the vehicle 108. This results in an over design of the vehicle 108, as well as a tremendous amount of fuel consumption. Using the system 106 of the present invention, a minimal amount of fuel within the fuel tank 112 is necessary for the vehicle 108 to lift off. Due to the fact that the fuel is not stored within the vehicle 108, the payload may be increased or a savings in fuel consumption realized.

Figure 7:
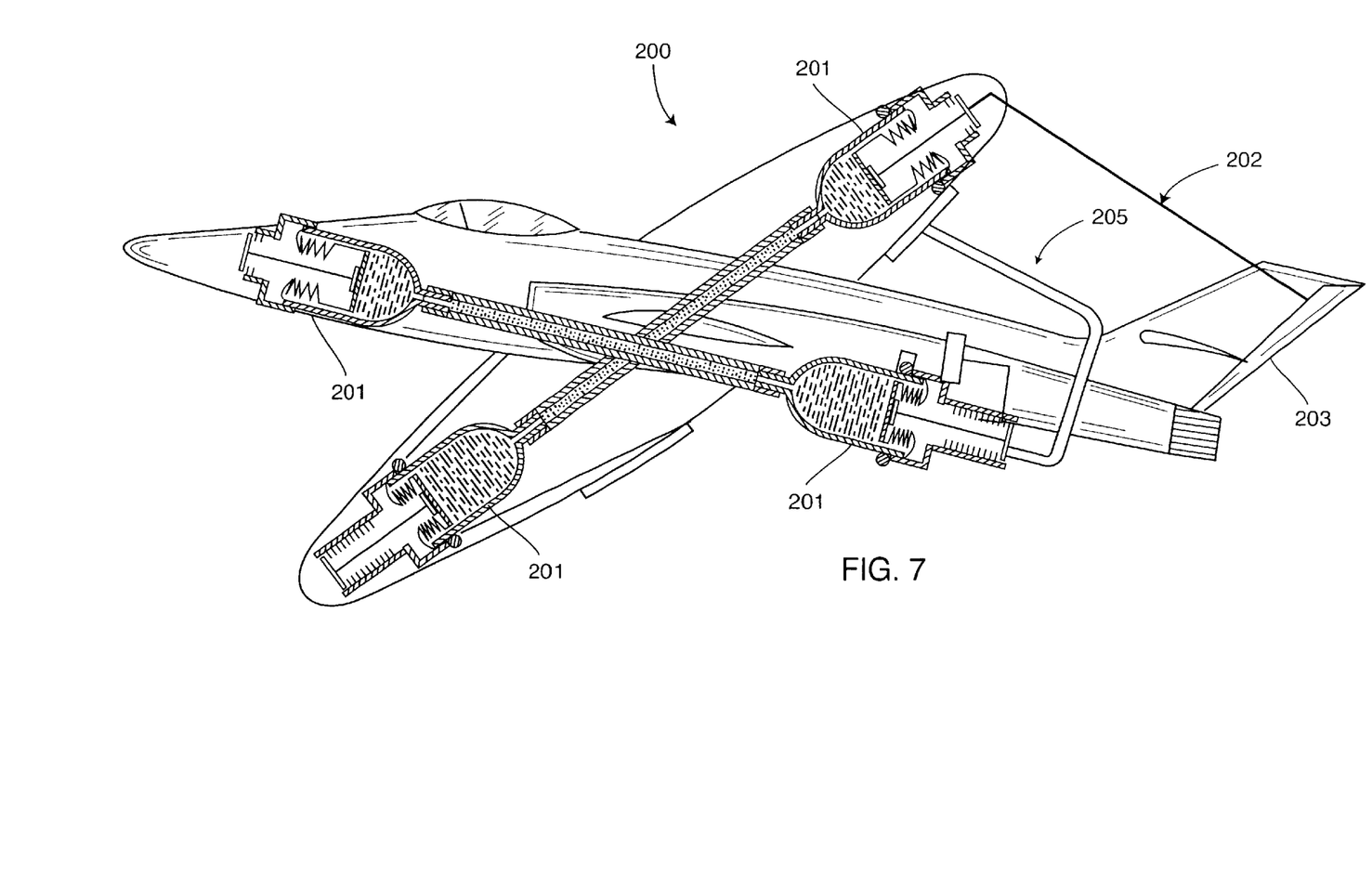
FIG. 7 is a schematic view of another closed fluid transfer system embodying the present invention, illustrating the transfer of fluid between multiple hollow bodies positioned with an aircraft to alter the movement of the aircraft.

With reference now to FIG. 7, yet another fluid transfer system 200 is shown. The system 200 includes multiple hollow bodies 201 which are fluidly interconnected. Such hollow bodies include a flexible wall to facilitate fluid flow, and can comprise a variable volume fluid storage tank as disclosed in U.S. Pat. No. 6,125,882 by Kong. Fluid can be transferred from one tank 201 to another to balance the aircraft, or to cause the aircraft to pitch upward or downward, or make left or right turns. If found necessary, the liquid can be passed through the rudder 203 via line 202 to affect the movement of the aircraft. Similarly, other fluid lines 205 may be passed across other flight control mechanisms to create and control the movement of the aircraft. The flow of the fluid can be accomplished through servos positioned either at the end of the tanks 201 or within the lines connecting the tanks 201 to control the fluid flow therebetween.

Although several embodiments have been described in detail for purposes of illustration, various modifications may be made without departing from the scope and spirit of the invention. Accordingly, the invention is not to be limited, except as by the appended claims.

What is claimed is:

1. A closed fluid transfer system, comprising:
   a fluid source;
   a hollow body in fluid communication with the fluid source through an inlet thereof, the hollow body including a flexible and expandible wall at an end thereof and an outlet distal from the flexible and expandible wall; and
   means for transporting fluid from the fluid source to the hollow body.

2. The system of claim 1, wherein the wall is comprised of an elastomeric material.

3. The system of claim 1, including a tube extending from the fluid source to the hollow body inlet.

4. The system of claim 1, wherein the means for transporting comprises a pump associated with the system.

5. The system of claim 4, wherein the pump injects air into the fluid source.

6. The system of claim 1, including a tube extending from the outlet of the hollow body to the fluid source.

7. The system of claim 1, wherein the hollow body includes a one-way-valve generally opposite the flexible wall.

8. The system of claim 3, wherein the tube comprises a siphon tube.

9. The system of claim 8, wherein the tube includes a primer device intermediate the fluid source and the hollow body inlet.

10. The system of claim 8, including means for stopping the flow of fluid through the siphon tube.

11. The system of claim 1, wherein the hollow body comprises a fluid conditioning chamber.

12. The system of claim 1, wherein the wall includes a rigid portion extending substantially from side walls of the hollow body and capable of reciprocal travel within the hollow body.

13. The system of claim 1, wherein an energy production device is placed intermediate the outlet of the hollow body and the fluid source.

14. The system of claim 1, including a second hollow body having an inlet fluidly interconnected to the outlet of the hollow body and means for transporting fluid from the hollow body to the second hollow body, the second hollow body having a flexible and expandible wall at an end thereof and an outlet distal to the flexible and expandible wall.

15. The system of claim 14, wherein the means for transporting includes a gravitational flow tube extending from the outlet of the hollow body to the inlet of the second hollow body, wherein the outlet of the hollow body is elevated with respect to the inlet of the second hollow body.

16. The system of claim 14, wherein the means for transporting includes a pump associated with the system.

17. The system of claim 3, wherein the hollow body is fluidly connected to a transportation vehicle.

18. The system of claim 17, wherein the transportation vehicle comprises an aircraft vehicle.

19. The system of claim 17, wherein the fluid source comprises fuel.

20. The system of claim 19, including a second tube extending from an oxygen source to the transportation vehicle and means for transporting oxygen from the oxygen source to the vehicle.

* * * * *